United States Patent
Ha et al.

(10) Patent No.: US 12,451,779 B2
(45) Date of Patent: Oct. 21, 2025

(54) DRIVE SYSTEM OF A WASHING MACHINE

(71) Applicant: LG Electronics Inc., Seoul (KR)

(72) Inventors: Hyeonho Ha, Seoul (KR); Joohang Kang, Seoul (KR)

(73) Assignee: LG Electronics Inc., Seoul (KR)

( * ) Notice: Subject to any disclaimer, the term of this patent is extended or adjusted under 35 U.S.C. 154(b) by 322 days.

(21) Appl. No.: 18/207,519

(22) Filed: Jun. 8, 2023

(65) Prior Publication Data

US 2024/0136901 A1 Apr. 25, 2024
US 2024/0235350 A9 Jul. 11, 2024

(30) Foreign Application Priority Data

Oct. 21, 2022 (KR) .................. 10-2022-0136367

(51) Int. Cl.
| | |
|---|---|
| *D06F 37/30* | (2020.01) |
| *D06F 37/36* | (2006.01) |
| *H02K 7/12* | (2006.01) |
| *H02K 21/00* | (2006.01) |
| *H02K 21/02* | (2006.01) |
| *H02K 21/22* | (2006.01) |

(52) U.S. Cl.
CPC ......... *H02K 21/024* (2013.01); *D06F 37/304* (2013.01)

(58) Field of Classification Search
CPC .. H02K 21/024; H02K 21/027; H02K 21/023; H02K 21/022; H02K 21/021; H02K 21/02; H02K 21/00; H02K 21/22; H02K 7/1085; H02K 7/108; H02K 7/10; H02K 7/116; H02K 7/12; H02K 7/14; H02K 1/2786; H02K 1/27915; H02K 2213/09; D06F 37/304; D06F 37/30; D06F 37/36; D06F 37/40; D06F 33/30
See application file for complete search history.

(56) References Cited

U.S. PATENT DOCUMENTS

| | | | | |
|---|---|---|---|---|
| 7,804,263 | B2 * | 9/2010 | Himmelmann | H02K 7/12 318/140 |
| 10,145,048 | B2 * | 12/2018 | Ito | F16D 11/14 |
| 10,927,490 | B2 * | 2/2021 | Aruga | D06F 37/40 |
| 11,401,647 | B2 * | 8/2022 | Choi | D06F 37/40 |
| 12,294,260 | B2 * | 5/2025 | Witt | H02K 21/24 |

(Continued)

FOREIGN PATENT DOCUMENTS

| | | | | |
|---|---|---|---|---|
| CN | 105463769 | A * | 4/2016 | |
| CN | 109660068 | A * | 4/2019 | H02K 7/10 |

(Continued)

*Primary Examiner* — Edgardo San Martin
(74) *Attorney, Agent, or Firm* — Fish & Richardson P.C.

(57) ABSTRACT

A system for driving a washing machine includes a housing; a plurality of supports extending from the housing in a vertical direction and spaced apart therefrom in a circumferential direction; a supporter supported by the plurality of supports and extending in a circumferential direction; a stator movably coupled to the plurality of supports in a vertical direction; a rotor facing the stator; an output shaft coupled to the rotor and bearing-coupled to the housing; a plurality of cam guides extending radially inward of the stator; and an actuator for adjusting an area where the stator and the rotor face each other by moving the plurality of cam guides in a vertical direction.

20 Claims, 15 Drawing Sheets

(56) References Cited

U.S. PATENT DOCUMENTS

| | | | | |
|---|---|---|---|---|
| 2005/0104469 A1* | 5/2005 | Zepp | .................... | H02K 11/21 |
| | | | | 310/191 |
| 2007/0241628 A1* | 10/2007 | Himmelmann | ...... | H02K 21/027 |
| | | | | 310/191 |
| 2008/0106162 A1* | 5/2008 | Naitou | ................ | H02K 21/026 |
| | | | | 310/78 |
| 2012/0286615 A1* | 11/2012 | Kauppi | ............... | H02P 23/0004 |
| | | | | 310/191 |
| 2017/0145611 A1* | 5/2017 | Yazawa | .................. | F16D 11/10 |
| 2019/0063509 A1* | 2/2019 | Wittig | .................. | F16D 48/064 |
| 2022/0205161 A1* | 6/2022 | Woo | ........................ | D06F 39/12 |
| 2023/0216388 A1* | 7/2023 | Kuhl | .................... | H02K 21/027 |
| | | | | 310/90 |

FOREIGN PATENT DOCUMENTS

| | | | | |
|---|---|---|---|---|
| DE | 102015120482 A1 * | 6/2016 | ........... | H02K 21/024 |
| EP | 4488438 A1 * | 1/2025 | ............. | D06F 37/40 |
| JP | H0937598 A * | 2/1997 | | |
| JP | 2008022637 A * | 1/2008 | | |
| JP | 2010057209 A * | 3/2010 | | |
| JP | 6118569 B2 * | 4/2017 | ............. | H02K 7/006 |
| KR | 19990066656 A * | 8/1999 | ............. | D06F 37/40 |
| KR | 10-1920812 | 11/2018 | | |
| KR | 10-2020-0089604 | 7/2020 | | |
| KR | 20200082340 A * | 7/2020 | ........... | F16D 27/118 |

\* cited by examiner

100

DRIVE SYSTEM OF A WASHING MACHINE

CROSS-REFERENCE TO RELATED APPLICATIONS

This application claims the benefit of Korea Patent Application No. 10-2022-0136367, filed on Oct. 21, 2022, which is incorporated herein by reference for all purposes as if fully set forth herein.

TECHNICAL FIELD

The present disclosure relates to a system for driving a washing machine and, more particularly, to a system for driving a washing machine capable of moving a mechanically operated mover in an axial direction.

BACKGROUND

A washing machine operates in two main operating modes (washing mode and spin-drying mode) with different operating conditions.

In order to operate in both of the two main operating modes, a washing machine has a set of planetary gears and a clutch, and operates an output shaft at low speed and high torque with a gear ratio of n:1 (washing mode) or operates the output shaft at high speed and low torque with a gear ratio of 1:1 (spin-drying mode).

Here, the output shaft refers to a shaft coupled to a drum to rotate the drum. The drum may be referred to as an "inner tub."

That is, in the case of an ordinary washing machine, after the washing mode or rinsing mode ends, a motor temporarily stops, and the water drainage starts. Then, after the drainage is finished, an initial spin-drying mode starts.

Here, since high torque is required to start spinning wet laundry in the initial spin-drying mode, the output shaft needs to be operated at low speed and high torque.

Then, in order to start the operation in the spin-drying mode after the operation in the initial spin-drying mode is completed, it is necessary to operate the output shaft at high speed and low torque.

Therefore, a system for driving a washing machine includes components such as the set of planetary gears and the clutch for changing the rotational force of a rotor shaft transmitted to the output shaft between the initial spin-drying mode and the spin-drying mode.

Related art discloses the structure where the set of planetary gears including a carrier, a sun gear, a plurality of planetary gears, an internal gear, etc. are installed in a rotor case and a gear ratio is changed by changing the position of the internal gear through a solenoid clutch.

That is, in the related art, the internal gear is supported by a stator through a slider of the solenoid clutch in the initial spin-drying mode, so that the rotations of the rotor shaft and the sun gear are transmitted to the output shaft by the set of planetary gears, thereby operating a washing machine at low speed and high torque.

In the spin-drying mode, the internal gear is supported by the rotor shaft through the slider of the solenoid clutch, so that the rotations of the rotor shaft and the sun gear are transmitted to the output shaft without going through the set of planetary gears, thereby operating the washing machine at high speed and low torque.

However, in the case of the driving system disclosed in the related art, since a larger coil is required to obtain sufficient electromagnetic force to move the solenoid clutch, there is a problem in that the weight and volume of the solenoid clutch increase.

In addition, there are problems in that it is difficult to secure the capacity of a washing machine since the solenoid clutch is located behind a rotor and the stator and that a separate circuit needs to be prepared and wired between the rotor and stator to apply power to the solenoid clutch, making wiring work difficult.

Another related art discloses the structure where a gear ratio is changed while a reduction coupling unit including the set of planetary gears is moved forward and backward by a lever.

That is, in this related art, in the initial spin-drying mode, the reduction coupling unit is moved forward based on the operation of the lever of a lever unit, and therefore teeth formed on a coupling cap of the reduction coupling unit engage with teeth formed on a drum so that a washing machine is operated at low speed and high torque.

In addition, in the spin-drying mode, the reduction coupling unit is moved backward based on the operation of the lever of the lever unit, and therefore teeth formed on a coupling housing of the reduction coupling unit engage with teeth formed on a rotor housing so that the washing machine is operated at high speed and low torque.

However, the driving system disclosed in the related art above has a problem in that only spur gears, not helical gears, can be used as pinion gears and sun gears, resulting in noise, since the pinion gear provided in a carrier of the reduction coupling unit needs to move in an axial direction with respect to the sun gear.

Furthermore, since the forward and backward movement of the reduction coupling unit is possible only while a motor is stopped, there is a problem in that it is necessary to stop the motor when changing a mode.

In addition, the sun gear provided in the set of planetary gears rests on a bearing on an output shaft, and the output shaft is supported only by one bearing.

Therefore, in the initial spin-drying mode, the set of planetary gears serves as a support point so that the output shaft is supported by the set of planetary gears and the bearing, but, in the spin-drying mode, a rotor, the set of planetary gears, and the output shaft work as one so that the output shaft is supported only by one bearing, thereby lowering the durability of a washing machine operating in the spin-drying mode where the washing machine operates at high speed and low torque.

SUMMARY

The purpose of the present disclosure is to provide a system for driving a washing machine capable of operating a washing machine in a washing mode and a spin-drying mode without a pause in the operation between the end of washing and the start of spin-drying by moving a stator in an axial direction.

The purpose of the present disclosure is to provide a system for driving a washing machine capable of reducing the size of a product and production costs by driving an output shaft at low speed and high torque or at high speed and low torque even without a separate component such as a clutch.

The purpose of the present disclosure is to provide a system for driving a washing machine capable of improving its efficiency by moving the stator in an axial direction even without applying additional current.

The purpose of the present disclosure is to provide a system for driving a washing machine capable of moving and returning the stator in a vertical direction only with mechanical construction.

The purpose of the present disclosure is to provide a system for driving a washing machine capable of preventing the stator from tilting and moving the stator stably in a vertical direction.

The purpose of the present disclosure is to provide a system for driving a washing machine capable of preventing damage to a product by preventing a rotating cam and a supporter from disturbing its operation.

The purpose of the present disclosure is to provide a system for driving a washing machine capable of limiting the radial and vertical movement of the rotating cam.

The purpose of the present disclosure is to provide a system for driving a washing machine capable of improving its space efficiency.

The purpose of the present disclosure is to provide a system for driving a washing machine capable of preventing damage to a product by reducing friction between a cam guide and a rotating member.

To achieve the above-mentioned purposes, a system for driving a washing machine according to an aspect of the present disclosure includes a housing; a plurality of supports extending from the housing in a vertical direction and spaced apart therefrom in a circumferential direction; a supporter supported by the plurality of supports and extending in a circumferential direction; a stator movably coupled to the plurality of supports in a vertical direction; a rotor facing the stator; an output shaft coupled to the rotor and bearing-coupled to the housing; a plurality of cam guides extending radially inward of the stator; and an actuator for adjusting an area where the stator and the rotor face each other by moving the plurality of cam guides in a vertical direction.

Accordingly, it is possible to reduce the size of a product and production costs by driving the output shaft at low speed and high torque or at high speed and low torque even without a separate component such as a clutch.

The system for driving a washing machine further includes a rotating cam disposed between the housing and the supporter and extending in a circumferential direction, the rotating cam is rotated by the actuator, and the plurality of cam guides move in a vertical direction as the rotating cam rotates.

Therefore, it is possible to move the stator in an axial direction even without applying additional current so that the efficiency of the system for driving a washing machine is improved.

The rotating cam includes a plurality of inclined portions contacting each of the plurality of cam guides and a plurality of vertical portions that respectively connect contiguous ones among the plurality of inclined portions.

The stator includes a plurality of movement guides movably coupled to the plurality of supports in a vertical direction and a plurality of elastic members disposed between the plurality of movement guides and the supporter.

When the actuator is driven to rotate the rotating cam in one direction, the cam guide moves downward along the inclined portion, and, when the actuator stops, the stator is returned to its original position by the plurality of elastic members, and the cam guide comes into contact with the vertical portion.

Accordingly, it is possible to move and return the stator in a vertical direction only by mechanical construction.

The plurality of movement guides are spaced apart from the plurality of cam guides in a circumferential direction.

As a result, it is possible to prevent the stator from tilting and move the stator stably in a vertical direction.

A vertical distance between lower ends of the plurality of inclined portions and the supporter is shorter than a distance that the stator moves in a vertical direction.

Thus, it is possible to prevent damage to a product by preventing the rotating cam and the supporter from disturbing the operation.

The plurality of cam guides include protrusions formed on upper surfaces thereof, and the rotating cam is in contact with the upper surfaces of the plurality of cam guides and is disposed radially inward of the protrusions.

The rotating cam is rotatably coupled to the housing.

Accordingly, it is possible to limit the radial and vertical movement of the rotating cam.

The stator includes a core extending in a circumferential direction, a plurality of teeth extending radially outward from the core and spaced apart therefrom in a circumferential direction, a plurality of coils wound around the plurality of teeth, and an insulator surrounding the core and connected to the plurality of cam guides.

In that case, the rotor includes a frame coupled to the output shaft and a plurality of magnets disposed on an inner surface of the frame and facing the plurality of coils, and the frame is spaced apart from the supporter in a vertical direction.

As a result, it is possible to improve the space efficiency of the system for driving a washing machine.

The system for driving a washing machine further includes a plurality of rotating members rotatably coupled to the actuator and contacting the plurality of cam guides, and the length from a portion where the actuator is connected to the rotating member to one side of the rotating member is different from the length from the portion where the actuator is connected to the rotating member to the other side of the rotating member.

Therefore, it is possible to reduce the size of a product and production costs by driving the output shaft at low speed and high torque or at high speed and low torque even without a separate component such as a clutch.

The cam guide includes a curved portion formed on a surface facing the rotating member and having a curvature.

Thus, it is possible to prevent damage to a product by reducing friction between the cam guide and the rotating member.

The rotating member includes a first arc portion having a first curvature, a pair of straight portions extending from both sides of the first arc portion, and a second arc portion connecting the pair of straight portions and having a second curvature with a radius of curvature smaller than that of the first curvature.

Consequently, it is possible to improve the space efficiency while securing the distance that the stator moves in a vertical direction.

To achieve the above-mentioned purposes, a system for driving a washing machine according to an aspect of the present disclosure includes a housing; a plurality of supports extending from the housing in a vertical direction and spaced apart therefrom in a circumferential direction; a supporter supported by the plurality of supports and extending in a circumferential direction; a stator movably coupled to the plurality of supports in a vertical direction; a rotor facing the stator; an output shaft coupled to the rotor and bearing-coupled to the housing; a cam guide extending radially inward of the stator; and an actuator for adjusting an area where the stator and the rotor face each other by moving the cam guide in a vertical direction.

Therefore, it is possible to reduce the size of a product and production costs by driving the output shaft at low speed and high torque or at high speed and low torque even without a separate component such as a clutch.

According to the present disclosure, there is provided the system for driving a washing machine capable of operating a washing machine in a washing mode and a spin-drying mode without a pause in the operation between the end of washing and the start of spin-drying by moving a stator in an axial direction.

According to the present disclosure, there is provided the system for driving a washing machine capable of reducing the size of a product and production costs by driving the output shaft at low speed and high torque or at high speed and low torque even without a separate component such as a clutch.

According to the present disclosure, there is provided the system for driving a washing machine capable of improving its efficiency by moving the stator in an axial direction even without applying additional current.

According to the present disclosure, there is provided the system for driving a washing machine capable of moving and returning the stator in a vertical direction only with mechanical construction.

According to the present disclosure, there is provided the system for driving a washing machine capable of preventing the stator from tilting and moving the stator stably in a vertical direction.

According to the present disclosure, there is provided the system for driving a washing machine capable of preventing damage to a product by preventing a rotating cam and a supporter from disturbing its operation.

According to the present disclosure, there is provided the system for driving a washing machine capable of limiting the radial and vertical movement of the rotating cam.

According to the present disclosure, there is provided the system for driving a washing machine capable of improving its space efficiency.

According to the present disclosure, there is provided the system for driving a washing machine capable of preventing damage to a product by reducing friction between the cam guide and the rotating member.

DESCRIPTION OF EXEMPLARY EMBODIMENTS

Figure 1:
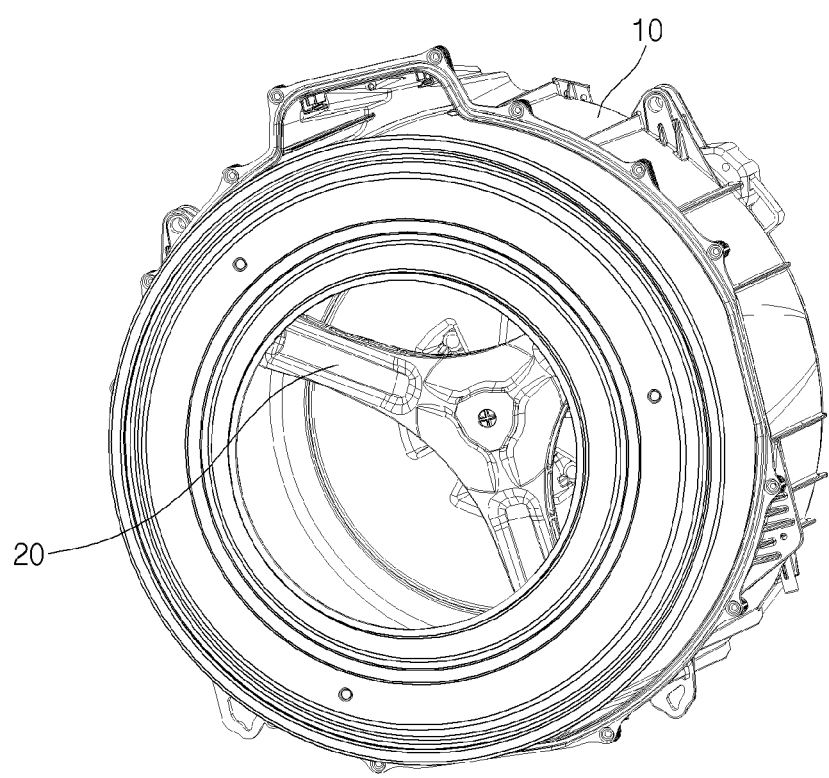
FIGS. 1 and 2 are perspective views of a tub of a washing machine and a system for driving the washing machine according to an embodiment of the present disclosure.

Hereinafter, the embodiments disclosed in the present disclosure will be described in detail with reference to the accompanying drawings, but, regardless of the drawing reference numerals, the same reference numerals will be assigned to the same or similar components, and descriptions thereof will not be repeated.

In describing the embodiments disclosed in the present disclosure, when a component is referred to as being "connected" or "contiguous" to another component, it should be understood that the component may be directly connected or contiguous to the other component, or other components may exist therebetween.

In addition, in describing the embodiments disclosed in the present disclosure, when it is determined that detailed descriptions of well-known arts related to the present disclosure may obscure the gist of the embodiments, the detailed descriptions of the arts will not be provided. Furthermore, the accompanying drawings are only for easy understanding of the embodiments disclosed in the present disclosure, and the technology disclosed in the present disclosure is not limited by the drawings and should be deemed to include all modifications, equivalents, and substitutes included in the technology and scope of the present disclosure.

Meanwhile, the term "disclosure" may be replaced with another term such as "document," "specification," and "description."

Figure 2:
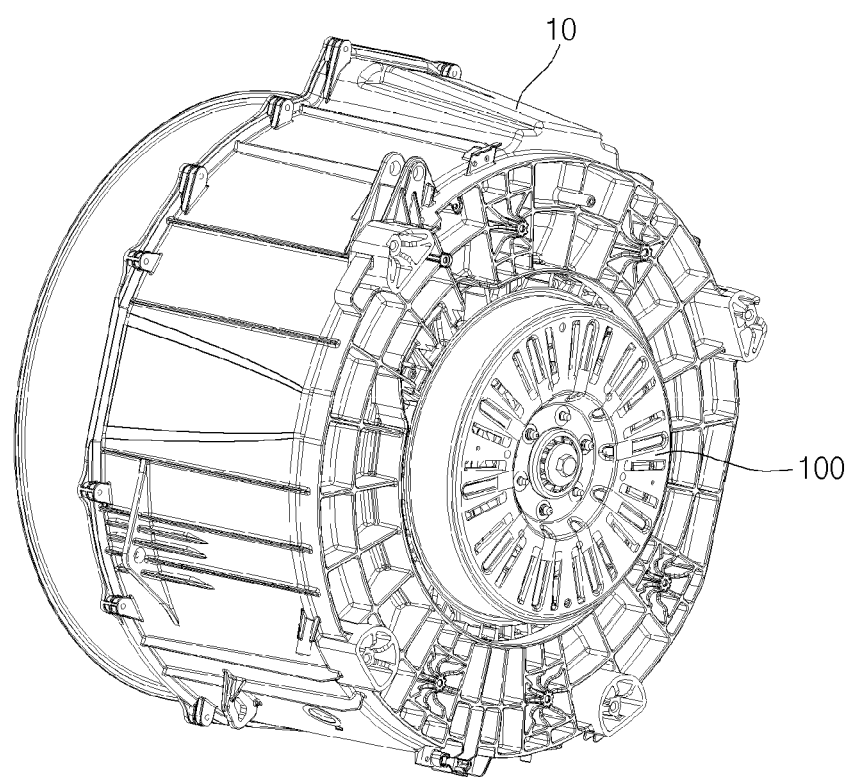
Figure 3:
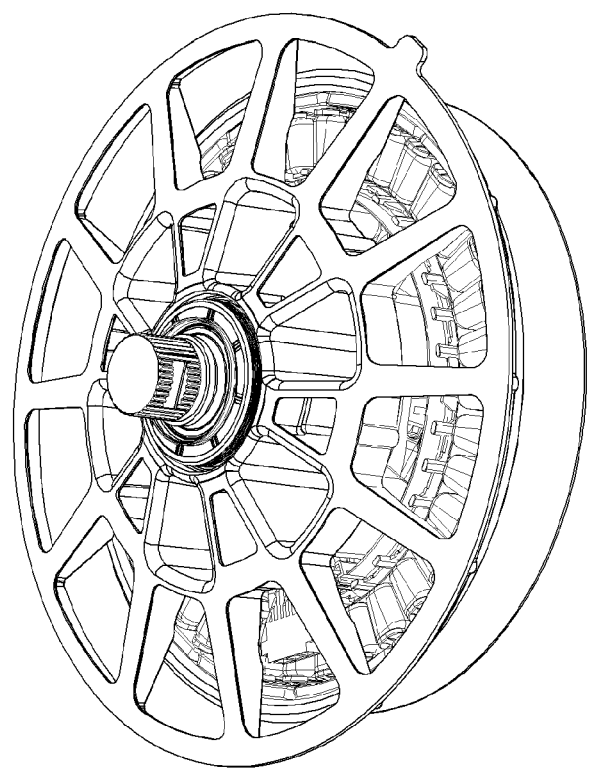
FIG. 3 is a perspective view of the system for driving a washing machine according to an embodiment of the present disclosure.
Figure 4:
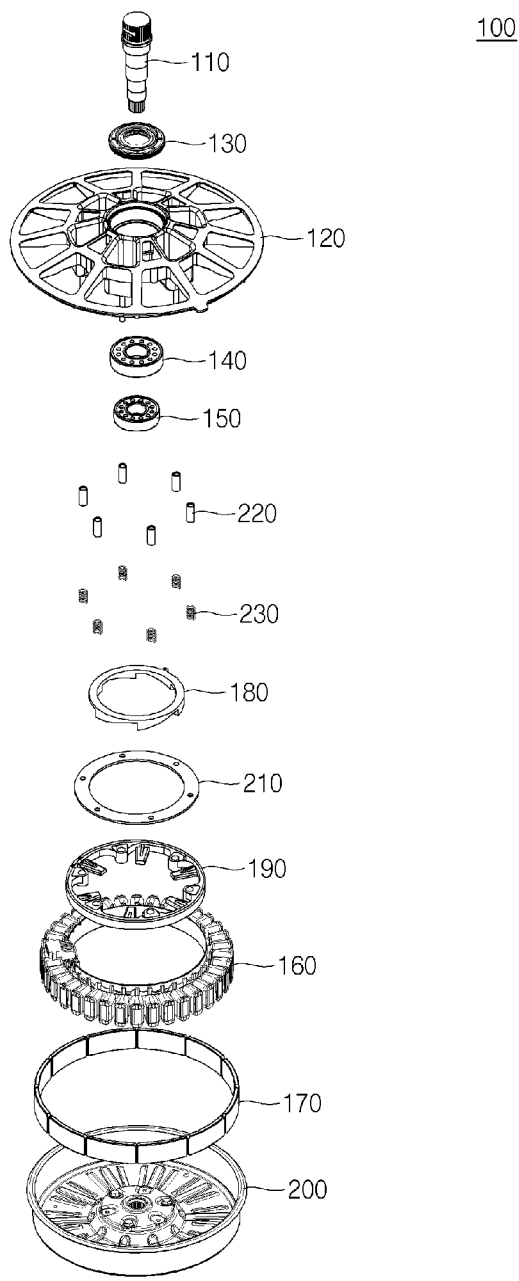
FIG. 4 is an exploded perspective view of the system for driving a washing machine according to an embodiment of the present disclosure.
Figure 5:
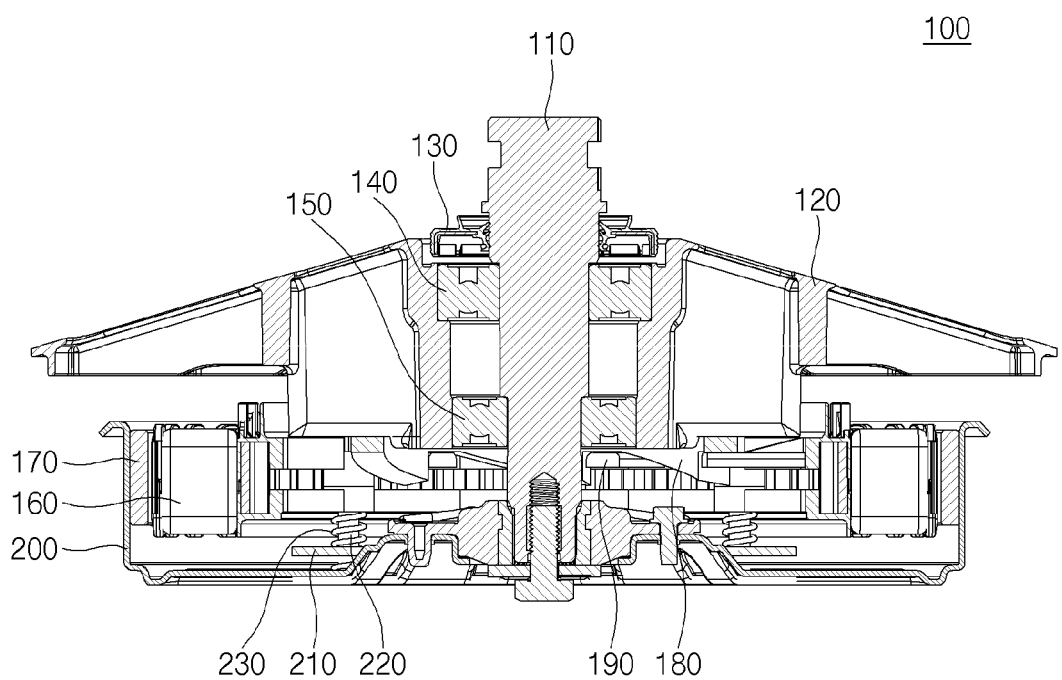
FIG. 5 is a cross-sectional view of the system for driving a washing machine according to an embodiment of the present disclosure.
Figure 6:
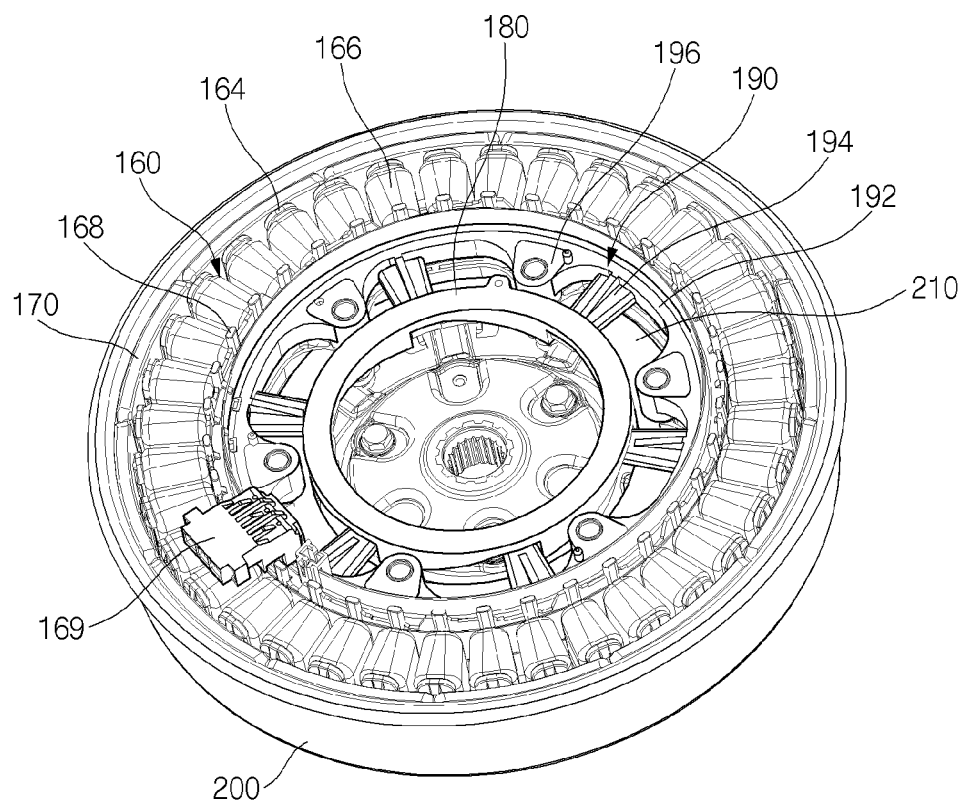
FIG. 6 is a perspective view of the system for driving a washing machine in FIG. 3 from which a housing and a plurality of supports have been removed.
Figure 7:
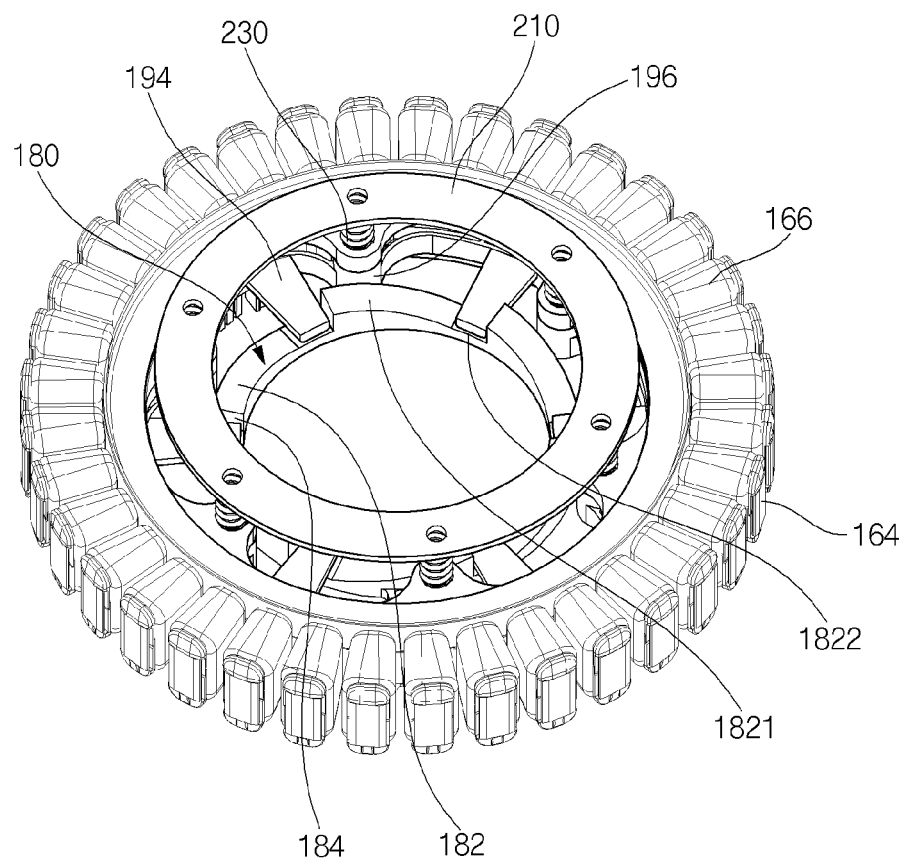
FIG. 7 is a bottom perspective view of the system for driving a washing machine in FIG. 6 from which rotors have been removed.
Figure 8:
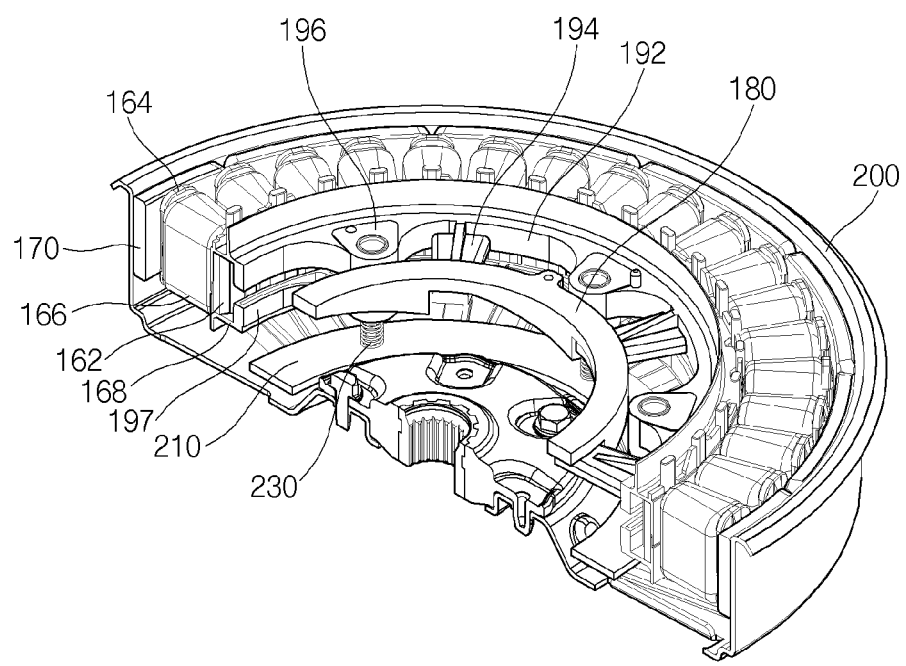
FIG. 8 is a cross-sectional perspective view of the system for driving a washing machine in FIG. 3 from which the housing and the plurality of supports have been removed.
Figure 9:
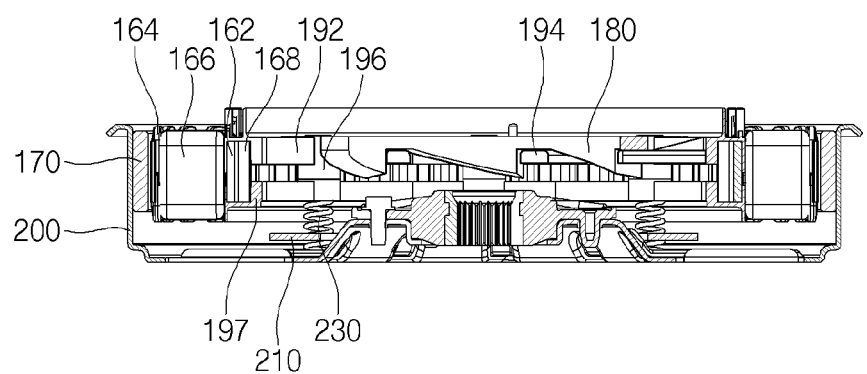
FIG. 9 is a cross-sectional view of the system for driving a washing machine in FIG. 3 from which the housing and the plurality of supports have been removed.
Figure 10:
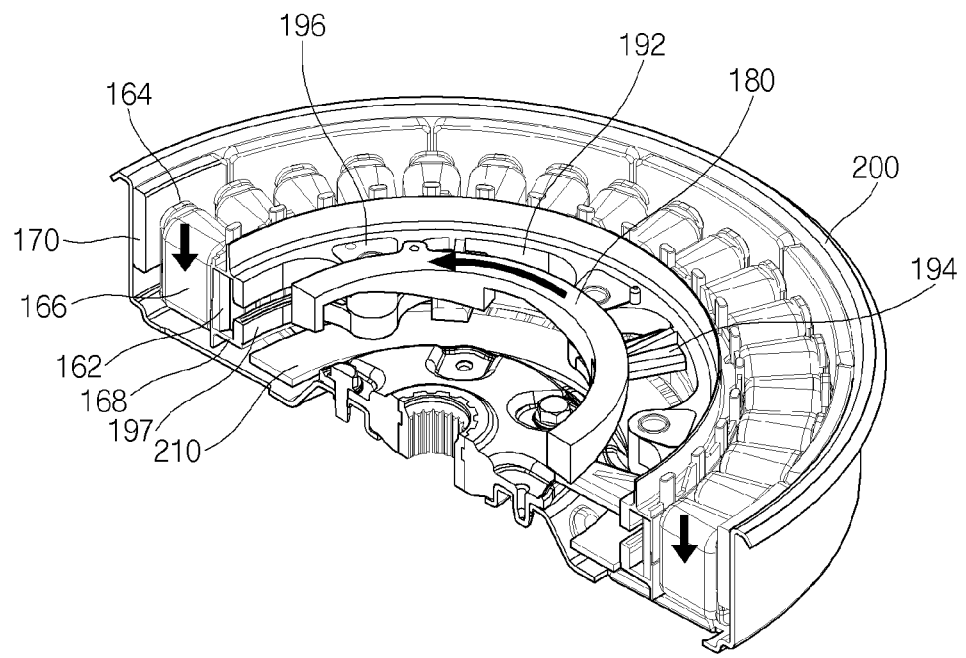
FIG. 10 is a view illustrating the operation of the system for driving a washing machine according to an embodiment of the present disclosure.

FIGS. 1 and 2 are perspective views of a tub of a washing machine and a system for driving the washing machine according to an embodiment of the present disclosure. FIG. 3 is a perspective view of the system for driving a washing machine according to an embodiment of the present disclosure. FIG. 4 is an exploded perspective view of the system for driving a washing machine according to an embodiment of the present disclosure. FIG. 5 is a cross-sectional view of the system for driving a washing machine according to an embodiment of the present disclosure. FIG. 6 is a perspective view of the system for driving a washing machine in FIG. 3 from which a housing and a plurality of supports have been removed. FIG. 7 is a bottom perspective view of the system for driving a washing machine in FIG. 6 from which rotors have been removed. FIG. 8 is a cross-sectional perspective view of the system for driving a washing machine in FIG. 3 from which the housing and the plurality of supports have been removed. FIG. 9 is a cross-sectional view of the system for driving a washing machine in FIG. 3 from which the housing and the plurality of supports have been removed. FIG. 10 is a view illustrating the operation of the system for driving a washing machine according to an embodiment of the present disclosure.

Referring to FIGS. 1 to 9, a washing machine according to an embodiment of the present disclosure may include an inner tub 10, a pulsator 20, and a system for driving a washing machine 100 but may also be embodied without some of these components, and the addition of other components is not excluded.

The washing machine according to an embodiment of the present disclosure may be of a top loading type where the center of rotation of the inner tub is formed in a direction perpendicular to the floor and laundry clothes can be loaded from the top, and may be of a front loading type where the center of rotation of the inner tub is formed in a direction horizontal to the floor or is inclined to become lower toward a lower end, and laundry clothes can be loaded from the front.

The inner tub 10 may have a cylindrical shape with an open top or front. The pulsator 20 may be disposed on a bottom surface of the inner tub 10. The inner tub 10 may be formed of a plastic material. The pulsator 20 may be connected to an output shaft 110 of the system for driving a washing machine 100. The system for driving a washing machine 100 may be coupled to the inner tub 10 to rotate the pulsator 20.

The system for driving a washing machine 100 according to an embodiment of the present disclosure may include a housing 120, the output shaft 110, a first bearing 140, a second bearing 150, a third bearing 130, a stator 160, rotors 170 and 200, a rotating cam 180, a cam guide 194, a supporter 210, a support 220, and an elastic member 230 but may also be embodied without some of these components, and the addition of other components is not excluded.

The output shaft 110 may be rotatably disposed with the housing 120. The pulsator 20 may be disposed above the housing 120. The housing 120 may be coupled to the inner tub 10. The stator 160 and the rotors 170 and 200 may be disposed under the housing 120. The housing 120 may be formed of a metal material. The housing 120 may double-radiate to the inner tub 10, but is not limited thereto.

The output shaft 110 may extend in an axial direction. The output shaft 110 may be coupled with the pulsator 20. The output shaft 110 may be rotatably coupled to the housing 120. The output shaft 110 may be bearing-coupled to the housing 120. The output shaft 110 may be coupled to the rotors 170 and 200. The output shaft 110 may rotate at the same speed as the rotors 170 and 200. In one embodiment of the present disclosure, the "axial direction" may be interpreted as meaning the vertical direction as shown in FIGS. 4 and 5.

The pulsator 20 may be coupled to an upper area of the output shaft 110. A central area of the output shaft 110 may be bearing-coupled to the housing 120. The first bearing 140 and the second bearing 150 may be disposed between the central area of the output shaft 110 and the housing 120.

A lower area of the output shaft 110 may be disposed inside the rotors 170 and 200. The lower area of the output shaft 110 may be coupled to the rotors 170 and 200. The diameter of the lower area of the output shaft 110 may be smaller than the diameter of the central area. The axial length of the lower area of the output shaft 110 may be longer than the axial length of the central area of the output shaft 110.

The first bearing 140 may be disposed between the housing 120 and the output shaft 110. The output shaft 110 may be bearing-coupled to the housing 120 by the first bearing 140. The output shaft 110 may be rotatably coupled to the housing 120 by the first bearing 140. The first bearing 140 may extend in a circumferential direction. The first bearing 140 may be disposed below the third bearing 130. The first bearing 140 may be disposed above the second bearing 150.

The second bearing 150 may be disposed between the housing 120 and the output shaft 110. The output shaft 110 may be bearing-coupled to the housing 120 by the second bearing 150. The output shaft 110 may be rotatably coupled to the housing 120 by the second bearing 150. The second bearing 150 may extend in a circumferential direction. The second bearing 150 may be disposed below the first bearing 140.

The third bearing 130 may be disposed between the output shaft 110 and the housing 120. The output shaft 110 may be rotatably coupled to the housing 120 by the third bearing 130. The third bearing 130 may be disposed above the first bearing 140.

The stator 160 may be coupled to the plurality of supports 220. The stator 160 may be movably coupled to the plurality of supports 220 in a vertical direction. The stator 160 may face the rotors 170 and 200. The stator 160 may extend in a circumferential direction. Inside the stator 160, the plurality of cam guides 194 may be coupled or integrally formed.

The stator 160 may include a core 162, a plurality of teeth 164, a plurality of coils 166, a connector 169, an insulator 168, a circumferential portion 190, and a plurality of movement guides 196, but the addition of other components is not excluded.

The core 162 may extend in a circumferential direction. The plurality of teeth 164 may extend radially outward from the core 162. The plurality of teeth 164 may be spaced apart from each other in a circumferential direction.

Each of the plurality of coils 166 may be wound around each of the plurality of teeth 164. The plurality of coils 166 may face the rotors 170 and 200. The plurality of coils 166 may face a magnet 170. The plurality of coils 166 may be electrically connected to the connector 169. The plurality of coils 166 may receive current from a power source connected to the connector 169 and interact with the magnet 170 electromagnetically.

The insulator 168 may surround the core 162. The insulator 168 may be connected to the plurality of cam guides 194. The insulator 168 may be connected to the plurality of cam guides 194 through the circumferential portion 190. The insulator 168 may be formed of a non-magnetic material.

The circumferential portion 190 may be disposed radially inward of the insulator 168. The circumferential portion 190 may be coupled to the insulator 168. The circumferential portion 190 may be integrally formed with the insulator 168. The circumferential portion 190 may be formed of the same material as the insulator 168. Alternatively, the circumferential portion 190 may be formed separately from the insulator 168 and coupled to the inside of the insulator 168. The plurality of movement guides 196 may be formed radially inward of the circumferential portion 190. The plurality of cam guides 194 may be formed radially inward of the circumferential portion 190.

The circumferential portion 190 may include an upper circumferential portion 192 and a lower circumferential portion 197. The upper circumferential portion 192 and the lower circumferential portion 197 may be vertically spaced apart from each other. The plurality of movement guides 196 may be formed inside the upper circumferential portion 192 and/or the lower circumferential portion 197.

The plurality of movement guides 196 may be formed radially inward of the circumferential portion 190. The plurality of movement guides 196 may be movably coupled to the plurality of supports 220 in a vertical direction. The plurality of movement guides 196 may have through-holes through which the plurality of supports 220 pass. The number of the plurality of movement guides 196 may correspond to the number of the plurality of supports 220. The elastic member 230 may be disposed below the plurality of movement guides 196. The plurality of movement guides 196 may be spaced apart from the plurality of cam guides 194 in a circumferential direction. As a result, it may be possible to prevent the stator 160 from tilting and move the stator 160 stably in a vertical direction.

The rotors 170 and 200 may face the stator 160. The output shaft 110 may be coupled to the rotors 170 and 200. The rotors 170 and 200 may rotate the output shaft 110 in one direction or the other direction by electromagnetically interacting with the stator 160.

The rotors 170 and 200 may include the magnet 170 and a frame 200, but the addition of other components is not excluded.

The frame 200 may be coupled with the output shaft 110. The frame 200 may be spaced apart from the supporter 210 in a vertical direction. A bottom surface of the frame 200 may be spaced apart from the supporter 210 in a vertical direction. Aside surface of the frame 200 may extend upward and radially outward from the bottom surface. The magnet 170 may be disposed with the frame 200.

The magnet 170 may be disposed on an inner side of the side surface the frame 200. The magnet 170 may face the plurality of coils 166. The magnet 170 may include a plurality of magnets 170 facing the plurality of coils 166. The plurality of magnets 170 may be spaced apart in a circumferential direction.

The rotating cam 180 may be disposed between the housing 120 and the supporter 210. The rotating cam 180 may extend in a circumferential direction. The diameter of the rotating cam 180 may be smaller than that of the supporter 210. The rotating cam 180 may be rotated in one direction or the other direction by an actuator. The rotating cam 180 may contact upper surfaces of the plurality of cam guides 194. The rotating cam 180 may vertically move the plurality of cam guides 194 by rotating. As a result, it may be possible to move the stator 160 in the axial direction without applying additional current, thereby improving the efficiency of the system for driving a washing machine 100.

The rotating cam 180 may be disposed radially inward of protrusions formed on the upper surfaces of the plurality of cam guides 194. The rotating cam 180 may be rotatably coupled to the housing 120. Accordingly, it may be possible to limit the movement of the rotating cam 180 in a radial direction and a vertical direction.

The rotating cam 180 may include an inclined portion 182 and a vertical portion 184. The inclined portion 182 may include a plurality of inclined portions 182 contacting each of the plurality of cam guides 194. The plurality of inclined portions 182 may be spaced apart in a circumferential direction. The vertical portion 184 may include a plurality of vertical portions 184 respectively connecting contiguous inclined portions among the plurality of inclined portions 182.

In addition, the vertical distance between lower ends of the plurality of inclined portions 182 and the supporter 210 may be shorter than the distance that the stator 160 moves in a vertical direction. As a result, it may be possible to prevent a product from being damaged by preventing the rotating cam 180 and the supporter 210 from disturbing the operation.

The inclined portion 182 may include a first inclined portion 1821 and a second inclined portion 1822 connected to the first inclined portion 1821 and having a lower slope than that of the first inclined portion 1821.

The cam guide 194 may be coupled to the stator 160. The cam guide 194 may extend radially inward of the stator 160. The cam guide 194 may include the plurality of cam guides 194 spaced apart in a circumferential direction. The cam guide 194 may contact a lower surface of the rotating cam 180. The cam guide 194 may move in a vertical direction as the rotating cam 180 rotates. The cam guide 194 may move in a vertical direction to move the stator 160 in a vertical direction. The cam guide 194 may be integrally formed with the stator 160. Alternatively, the cam guide 194 may be formed as a separate member and coupled to the stator 160. The plurality of cam guides 194 may be spaced apart from the plurality of movement guides 196 in a circumferential direction.

The supporter 210 may be supported by the plurality of supports 220. The supporter 210 may extend in a circumferential direction. The supporter 210 may be spaced apart from the frame 200 in a vertical direction. The supporter 210 may be formed in a circular band shape or a ring shape. The supporter 210 may be spaced apart from the rotors 170 and 200. The supporter 210 may be disposed above the bottom surface of the frame 200.

The support 220 may be coupled to the housing 120. The support 220 may extend from the housing 120 in a vertical or axial direction. The support 220 may be formed in a circular column shape. The supporter 210 may be coupled to a lower portion of the support 220. The elastic member 230 may be coupled to the support 220.

The support 220 may include the plurality of supports 220 spaced apart in a circumferential direction. In one embodiment of the present disclosure, the number of the plurality of supports 220 is five but is not limited thereto, and the number of the plurality of supports 220 may vary.

The elastic member 230 may be disposed between the plurality of movement guides 196 and the supporter 210. The elastic member 230 may surround the plurality of supports 220. The elastic member 230 may be formed of a material having elasticity. The elastic member 230 may be a coil spring. When the plurality of movement guides 196 move downward, the elastic member 230 may provide force to the plurality of movement guides 196 so that they return to their original positions.

The actuator may move the cam guide 194 in a vertical direction. The actuator may be connected to the rotating cam 180. The actuator may rotate the rotating cam 180 in one direction or the other direction. The actuator may rotate the rotating cam 180 to move the cam guide 194 in a vertical direction. Accordingly, it may be possible for the actuator to adjust the area where the stator 160 and the rotors 170 and 200 face each other.

Referring to FIG. 10, when the rotating cam 180 rotates in one direction as the actuator is driven, the cam guide 194 may move downward along the inclined portion 182 of the rotating cam 180. In this case, the stator 160 may move downward, and the area where the coil 166 and the magnet 170 face each other may be reduced. As a result, it may be possible that the rotational speed of the rotors 170 and 200 is reduced so that the output shaft 110 is driven at low speed and high torque.

When the actuator stops, the stator 160 may be returned to its original position by a plurality of elastic members 230. In this case, the cam guide 194 may push and rotate the inclined portion 182, and may be in contact with the vertical portion 184. Accordingly, it may be possible to move and return the stator 160 in a vertical direction only with mechanical construction.

In the initial mode, the rotors 170 and 200 may be driven at high speed and low torque. Therefore, it may be possible to drive the output shaft 110 at low speed and high torque or at high speed and low torque even without any separate component such as a clutch, thereby reducing the size of a product and production costs.

In one embodiment of the present disclosure, it has been described that the plurality of cam guides 194 are formed, but, alternatively, only one cam guide 194 may be formed.

Figure 11:
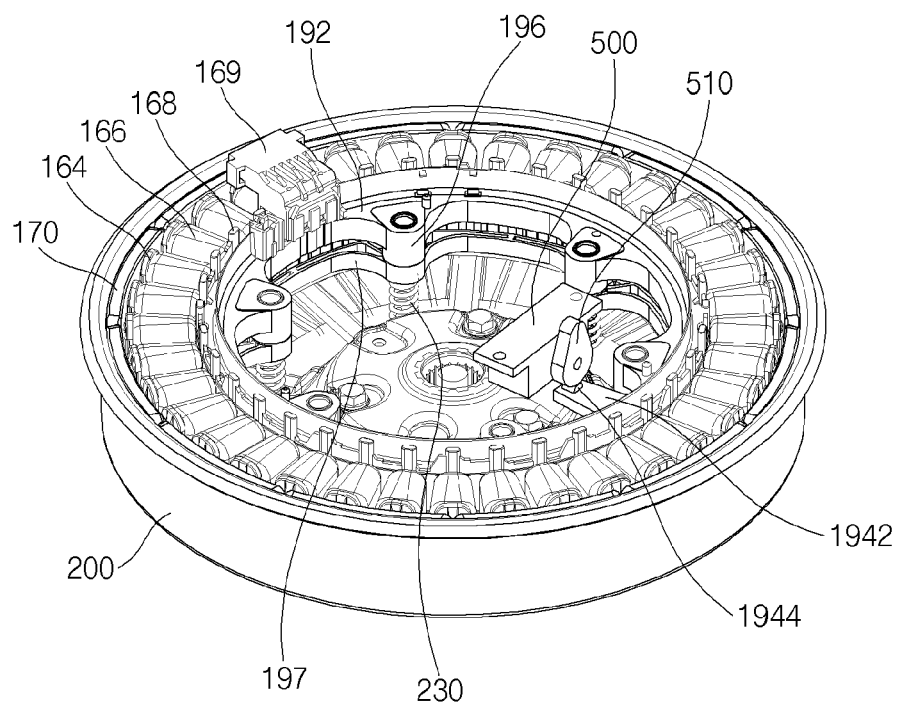
FIG. 11 is a perspective view of some components of a system for driving a washing machine according to another embodiment of the present disclosure.
Figure 12:
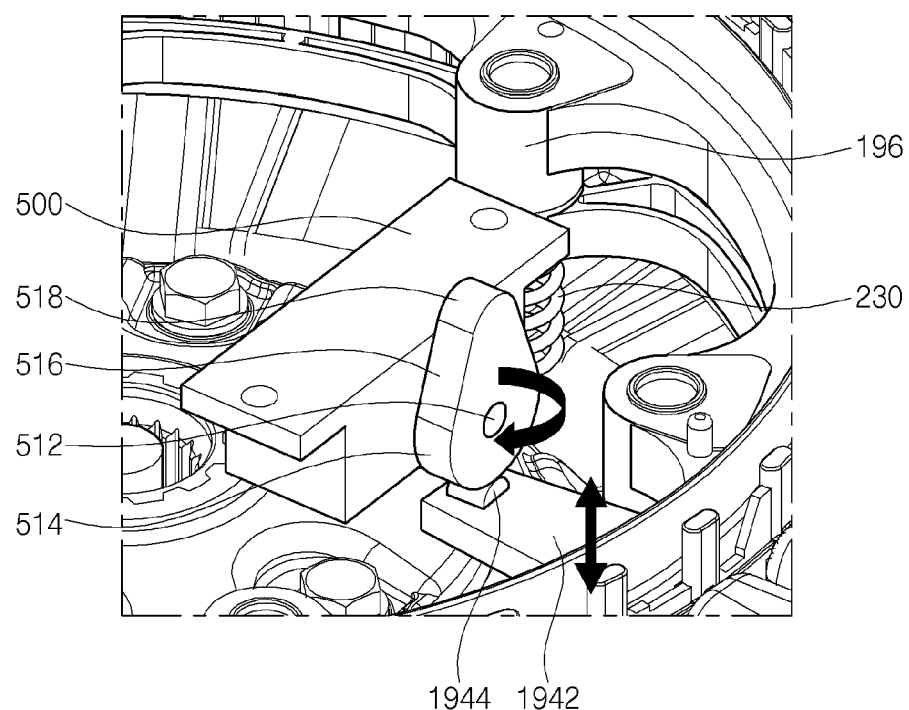
FIG. 12 is an enlarged view of the components in FIG. 11.

FIG. 11 is a perspective view of some components of a system for driving a washing machine according to another embodiment of the present disclosure. FIG. 12 is an enlarged view of the components in FIG. 11.

Referring to FIGS. 11 and 12, the system for driving a washing machine 100 according to another embodiment of the present disclosure may move a stator 160 in a vertical direction through a rotating member 510. The system for driving a washing machine 100 according to another embodiment of the present disclosure may be another version of the system for driving a washing machine 100 according to an embodiment of the present disclosure, where the rotating cam 180 is eliminated therefrom and the rotating member 510 is added thereto.

The rotating member 510 may be rotatably coupled to an actuator 500. The rotating member 510 may be in contact with a cam guide 194. As the actuator 500 rotates, the rotating member 510 may rotate to move the stator 160 connected to the cam guide 194 in a vertical direction.

The length from a portion 512 where the actuator 500 is connected to the rotating member 510 to one side of the rotating member 510 may be different from the length from the portion 512 where the actuator 500 is connected to the rotating member 510 to the other side of the rotating member 510. For example, the rotating member 510 may be formed in an elliptical shape. Alternatively, the rotating member 510 may be formed in a polygonal shape.

Therefore, it may be possible to drive an output shaft 110 at low speed and high torque or at high speed and low torque even without any separate component such as a clutch, thereby reducing the size of a product and production costs.

The rotating member 510 may include a first arc portion 514 having a first curvature, a pair of straight portions 516 extending from both sides of the first arc portion 514, and a second arc portion 518 connecting the pair of straight portions 516 and having a second curvature with a radius of curvature smaller than that of the first curvature. As a result, it may be possible to facilitate the manufacture of the rotating member 510 and easily adjust the distance that the stator 160 moves in a vertical direction.

The cam guide 194 may include a curved portion 1944 formed on a surface facing the rotating member 510 and having a curvature. Accordingly, it may be possible to reduce friction between the cam guide 194 and the rotating member 510 in order to prevent damage to a product.

Although FIGS. 11 and 12 show that one rotating member 510 and one cam guide 194 are formed, a plurality of rotating members 510 and a plurality of cam guides 194 may be formed.

Figure 13:
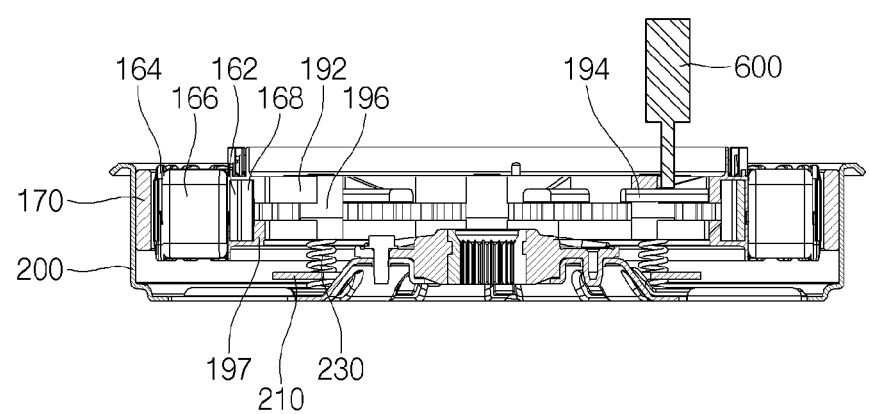
FIG. 13 is a cross-sectional view of some components of a system for driving a washing machine according to still another embodiment of the present disclosure.

FIG. 13 is a cross-sectional view of some components of a system for driving a washing machine according to still another embodiment of the present disclosure.

Referring to FIG. 13, an actuator 600 may directly move a cam guide 194 in a vertical direction. Specifically, the system for driving a washing machine 100 according to still another embodiment of the present disclosure may be another version of the system for driving a washing machine 100 according to an embodiment of the present disclosure, where a rotating cam 180 is eliminated therefrom and the actuator 600 directly moves the cam guide 194 in a vertical direction.

Figure 14:
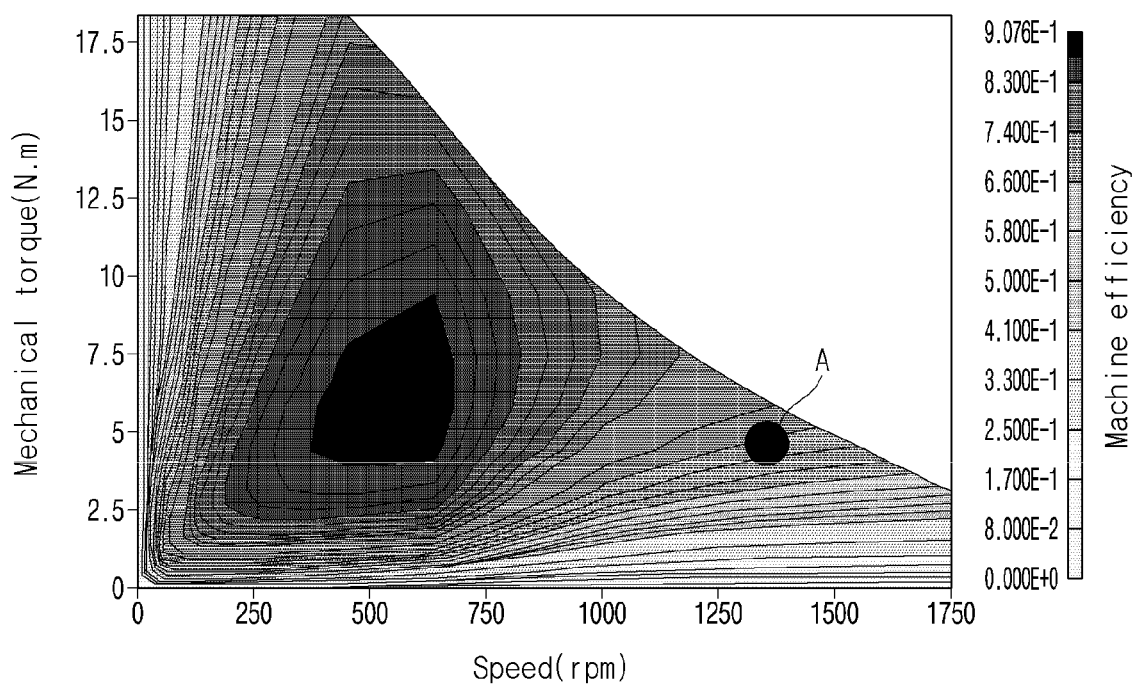
FIG. 14 is a graph showing mechanical torque versus rotational speed of a rotor according to the related art.
Figure 15:
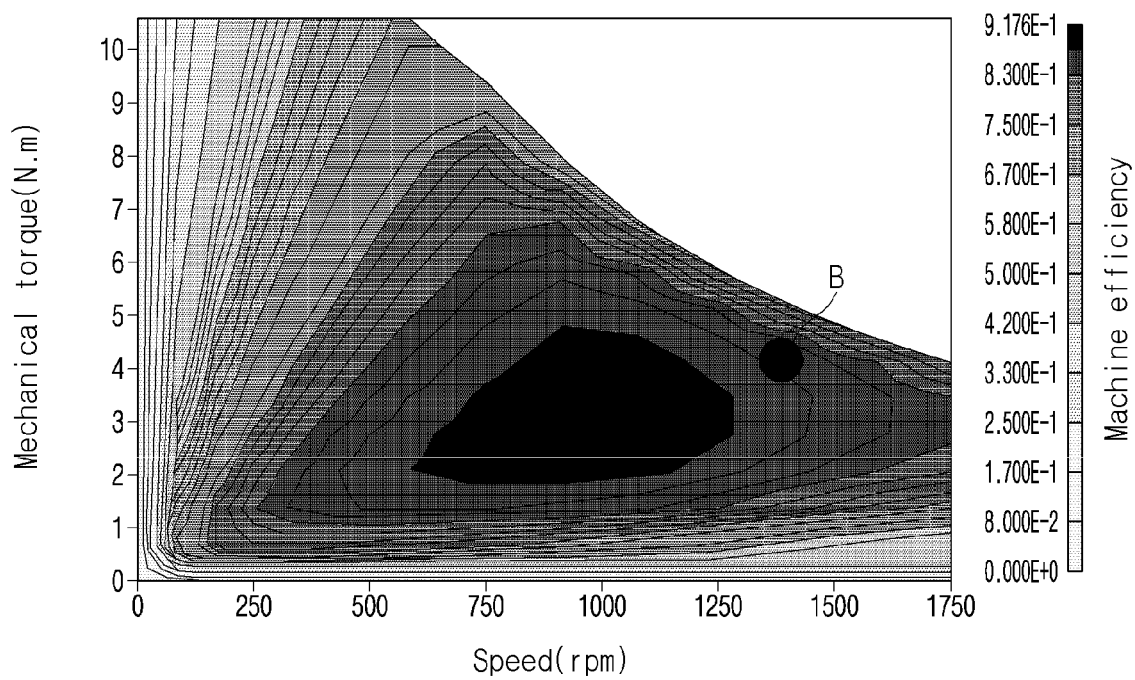
FIG. 15 is a graph showing mechanical torque versus rotational speed of a rotor according to the embodiments of the present disclosure.

FIG. 14 is a graph showing mechanical torque versus rotational speed of a rotor according to the related art. FIG. 15 is a graph showing mechanical torque versus rotational speed of a rotor according to the embodiments of the present disclosure.

FIG. 14 shows that the mechanical efficiency at the operating point "A" for spin-drying according to the related art is 80%. FIG. 15 shows that the mechanical efficiency at the operating point "B" for spin-drying according to the embodiments of the present disclosure rises to 90%. That is, mechanical efficiency may be improved when the operation of spin-drying is performed at high speed and low torque by the system for driving a washing machine 100 according to the embodiments of the present disclosure, thereby lowering electrical energy consumption and boosting the performance of spin-drying.

Certain embodiments or other embodiments of the present disclosure described above are not mutually exclusive or distinct from each other. Components or functions of each of the certain embodiments or other embodiments of the present disclosure may be used together or combined with each other.

For example, component A described in a specific embodiment and/or drawing may be combined with component B described in another embodiment and/or drawing. In other words, even if there is no direct description of the combination of the components, the components can be combined with each other unless it is described that the combination thereof is impossible.

The detailed description above should not be deemed restrictive in all respects, but should be deemed illustrative. The scope of the present disclosure should be determined based on reasonable interpretation of the appended claims, and all equivalent modifications of the present disclosure are included in the scope of the present disclosure.

What is claimed is:

1. A system for driving a washing machine, comprising:
   a housing;
   a plurality of supports extending from the housing in a vertical direction and spaced apart from each other in a circumferential direction of the housing;
   a supporter supported by the plurality of supports and extending in the circumferential direction;
   a stator coupled to the plurality of supports and configured to move relative to the plurality of supports in the vertical direction;
   a rotor facing the stator;
   an output shaft coupled to the rotor and coupled to the housing, the output shaft being configured to rotate relative to the housing;

a plurality of cam guides extending radially inward of the stator; and an actuator configured to move the plurality of cam guides in the vertical direction to thereby adjust an area where the stator and the rotor face each other.

2. The system of claim 1, further comprising:

a rotating cam disposed between the housing and the supporter and extending in the circumferential direction, the rotating cam being configured to be rotated by the actuator, wherein the plurality of cam guides is configured to move in the vertical direction based on rotation of the rotating cam.

3. The system of claim 2, wherein the rotating cam includes:

a plurality of inclined portions contacting the plurality of cam guides; and a plurality of vertical portions that respectively connect contiguous inclined portions among the plurality of inclined portions.

4. The system of claim 3, wherein the stator includes:

a plurality of movement guides coupled to the plurality of supports and configured to move relative to the plurality of supports in the vertical direction; and a plurality of elastic members disposed between the plurality of movement guides and the supporter.

5. The system of claim 4, wherein each of the plurality of cam guides is configured to, based on the actuator being driven to rotate the rotating cam in one direction, move downward along a corresponding inclined portion of the plurality of inclined portions, and when the actuator is configured to stop, the stator is configured to return to an original position by the plurality of elastic members, and the plurality of cam guides are configured to contact the plurality of vertical portions.

6. The system of claim 4, wherein the plurality of movement guides are spaced apart from the plurality of cam guides in the circumferential direction.

7. The system of claim 3, wherein a vertical distance between lower ends of the plurality of inclined portions and the supporter is shorter than a distance that the stator moves in the vertical direction.

8. The system of claim 2, wherein the plurality of cam guides include protrusions provided at upper surfaces of the plurality of cam guides, and wherein the rotating cam contacts the upper surfaces of the plurality of cam guides and is disposed radially inward of the protrusions.

9. The system of claim 2, wherein the rotating cam is coupled to the housing and configured to rotate relative to the housing.

10. The system of claim 1, wherein the stator includes:

a core extending in the circumferential direction, a plurality of teeth extending radially outward from the core and spaced apart from each other in the circumferential direction, a plurality of coils wound around the plurality of teeth; and an insulator surrounding the core and connected to the plurality of cam guides.

11. The system of claim 10, wherein the rotor includes:

a frame coupled to the output shaft; and a plurality of magnets disposed at an inner surface of the frame and facing the plurality of coils, wherein the frame is spaced apart from the supporter in the vertical direction.

12. The system of claim 1, further comprising:

a plurality of rotating members coupled to the actuator and configured to rotate relative to the actuator, the plurality of rotating members contacting the plurality of cam guides, wherein a length between a portion where the actuator is connected to the plurality of rotating members and a side of the plurality of rotating members is different from a length between the portion and an opposite side of the plurality of rotating members.

13. The system of claim 12, wherein the plurality of cam guides include a curved portion provided at a surface facing the plurality of rotating members.

14. The system of claim 12, wherein each of the plurality of rotating members includes:

a first arc portion having a first curvature;

a pair of straight portions extending from both sides of the first arc portion; and a second arc portion connecting the pair of straight portions and having a second curvature smaller than the first curvature.

15. A system for driving a washing machine, comprising:

a housing;

a plurality of supports extending from the housing in a vertical direction and spaced apart from each other in a circumferential direction;

a supporter supported by the plurality of supports and extending in the circumferential direction;

a stator coupled to the plurality of supports and configured to move relative to the plurality of supports in the vertical direction;

a rotor facing the stator;

an output shaft coupled to the rotor and bearing-coupled to the housing;

a cam guide extending radially inward of the stator; and an actuator configured to move the cam guide in the vertical direction to thereby adjust an area where the stator and the rotor face each other.

16. The system of claim 15, further comprising:

a rotating cam disposed between the housing and the supporter and extending in the circumferential direction, the rotating cam being configured to be rotated by the actuator, wherein the cam guide is configured to move in the vertical direction based on rotation of the rotating cam.

17. The system of claim 16, wherein the rotating cam includes:

a plurality of inclined portions contacting the cam guide; and a vertical portion that connects contiguous inclined portions among the plurality of inclined portions.

18. The system of claim 17, wherein the stator includes:

a plurality of movement guides coupled to the plurality of supports and configured to move relative to the plurality of supports in the vertical direction; and a plurality of elastic members disposed between the plurality of movement guides and the supporter.

19. The system of claim 18, wherein the cam guide is configured to, based on the actuator being driven to rotate the rotating cam in one direction, move downward along a corresponding inclined portion of the plurality of inclined portions, and when the actuator is configured to stop, the stator is configured to return to an original position by the plurality of elastic members, and the cam guide is configured to contact the vertical portion.

20. The system of claim 18, wherein the plurality of movement guides are spaced apart from the cam guide in the circumferential direction.

\* \* \* \* \*